(12) United States Patent
Mochizuki

(10) Patent No.: US 7,859,558 B2
(45) Date of Patent: Dec. 28, 2010

(54) OPTICAL SCANNING DEVICE, CONTROL METHOD THEREOF, AND IMAGE FORMING APPARATUS THEREWITH

(75) Inventor: Takeshi Mochizuki, Ibaraki (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/506,776

(22) Filed: Jul. 21, 2009

(65) Prior Publication Data

US 2010/0026777 A1 Feb. 4, 2010

(30) Foreign Application Priority Data

Jul. 31, 2008 (JP) ............................. 2008-197227
Feb. 23, 2009 (JP) ............................. 2009-039703

(51) Int. Cl.
*B41J 15/14* (2006.01)
*B41J 27/00* (2006.01)

(52) U.S. Cl. ...................................... 347/244; 347/258

(58) Field of Classification Search ................ 347/244, 347/256, 258, 241; 359/351, 676, 677
See application file for complete search history.

(56) References Cited

U.S. PATENT DOCUMENTS

| 5,033,806 A * | 7/1991 | Tomita et al. ............... 347/256 |
| 2007/0139333 A1* | 6/2007 | Sato et al. .................... 345/90 |
| 2008/0170282 A1* | 7/2008 | Amada et al. ............... 359/196 |

FOREIGN PATENT DOCUMENTS

| JP | 59-62821 | 4/1984 |
| JP | 2-238425 | 9/1990 |
| JP | 3-182715 | 8/1991 |
| JP | 3-290610 | 12/1991 |
| JP | 4-211231 | 8/1992 |
| JP | 7-261103 | 10/1995 |
| JP | 8-164632 | 6/1996 |
| JP | 3047082 | 3/2000 |
| JP | 2000-352677 | 12/2000 |
| JP | 2002-48988 | 2/2002 |
| JP | 2002-244063 | 8/2002 |
| JP | 2003-66355 | 3/2003 |
| JP | 2004-109782 | 4/2004 |
| JP | 3556389 | 5/2004 |
| JP | 3833542 | 7/2006 |
| JP | 3873049 | 10/2006 |
| JP | 2007-102108 | 4/2007 |
| JP | 2007-187739 | 7/2007 |

(Continued)

*Primary Examiner*—Hai C Pham
(74) *Attorney, Agent, or Firm*—Oblon, Spivak, McClelland, Maier & Neustadt, L.L.P.

(57) ABSTRACT

An optical scanning device is disclosed, including: a light deflection part, an imaging optical element, a variable focus optical element, and a focal point control device. The light deflection part repeatedly deflects and scans a light flux emitted from a light source on a scan surface. The imaging optical element forms an image in a vicinity of the scan surface with the light flux. The focal point control device changes a focal distance of the variable focus optical element, which is arranged in an optical path from the light source to the light deflection part, in executing each of deflection scans, and correct an image misalignment on the scan surface due to an optical path difference for each scan angle.

12 Claims, 14 Drawing Sheets

FOREIGN PATENT DOCUMENTS

| | | |
|---|---|---|
| JP | 2007-240608 | 9/2007 |
| JP | 2008-90259 | 4/2008 |
| JP | 4129972 | 5/2008 |
| JP | 2008-158415 | 7/2008 |
| JP | 2008-197336 | 8/2008 |
| JP | 2008-203360 | 9/2008 |

* cited by examiner

OPTICAL SCANNING DEVICE, CONTROL METHOD THEREOF, AND IMAGE FORMING APPARATUS THEREWITH

BACKGROUND OF THE INVENTION

1. Field of the Invention

The present invention is related to an optical scanning device used to carry out record formation of an electrostatic latent image on the photo conductive surface which is a surface to be scanned, a control method of the optical scanning device, and an image forming apparatus using the optical scanning device.

2. Description of the Related Art

An optical scanning device used for a laser printer or a like scans a surface to be scanned such as a photosensitive drum by light flux such as a laser beam by using an optical deflector such as a polygon mirror and an image optical element such as an Fθ lens, and forms an image. Conventionally, various technologies have been disclosed to suppress an imaging misalignment from the surface to be scanned.

There are cases in which the imaging misalignment can be caused by an optical path difference for each scanning angle in one scan execution between a starting side and a terminating side, in which a different imaging misalignment can be caused for each scan corresponding to a reflection surface accuracy of the polygon mirror, and in which the imaging misalignment can be caused with age by a change of a lens size or a laser wavelength by variations in environmental temperature. The optical path difference is a difference of a distance between optical elements such as lenses, or a difference caused by an optical path being changed due to a varied lens effect after being deflected by the polygon mirror.

Japanese Laid-open Patent No. 2004-109782 discloses to adjust a beam imaging position by changing a focal length of a variable focus optical element so as to correct an influence caused by an accuracy dispersion of a deflecting reflection face of the polygon mirror.

Japanese Laid-open Patents No. 2002-244063 and No. 2007-102108 disclose to correct the imaging misalignment due to temperature, by changing the focal length of the variable focus optical element in response to a detected temperature.

However, in the above described technologies, there is no effect to reduce the imaging misalignment corresponding to a scan angle since the focal length of the variable focus optical element is not changed in one scan execution.

Japanese Laid-open Patent No.59-62821 discloses that a perpendicular returning part is provided by arranging a mirror on an optical path, and a position of a focal point in a scan operation is changed by changing an optical path length by vibrating the mirror in a direction perpendicular to an optical path. However, the optical path becomes complex. Moreover, since the mirror is mechanically moved, accuracy is lower and a high speed response is significantly limited in practice.

SUMMARY OF THE INVENTION

The present invention solves or reduces one or more of the above problems.

In an aspect of this disclosure, there is provided an optical scanning device, including: a light deflection part configured to repeatedly deflect and scan a light flux emitted from a light source on a scan surface; an imaging optical element configured to form an image in a vicinity of the scan surface with the light flux; a variable focus optical element arranged in an optical path from the light source to the light deflection part; and a focal point control device configured to change a focal distance of the variable focus optical element in executing each of deflection scans, and correct an image misalignment on the scan surface due to an optical path difference for each scan angle.

In another aspect of this disclosure, there is provided a control method of an optical scanning device, including: repeatedly deflecting and scanning a light flux emitted from a light source on a scan surface by a light deflection part; forming an image in a vicinity of the scan surface with the light flux by an imaging optical element; changing a focal distance of a variable focus optical element, which is arranged in an optical path from the light source to the light deflection part, in executing each of deflection scans, and correct an image misalignment on the scan surface due to an optical path difference for each scan angle.

BRIEF DESCRIPTION OF THE DRAWINGS

In the following, embodiments of the present invention will be described with reference to the accompanying drawings.

DESCRIPTION OF THE PREFERRED EMBODIMENT

Figure 1:
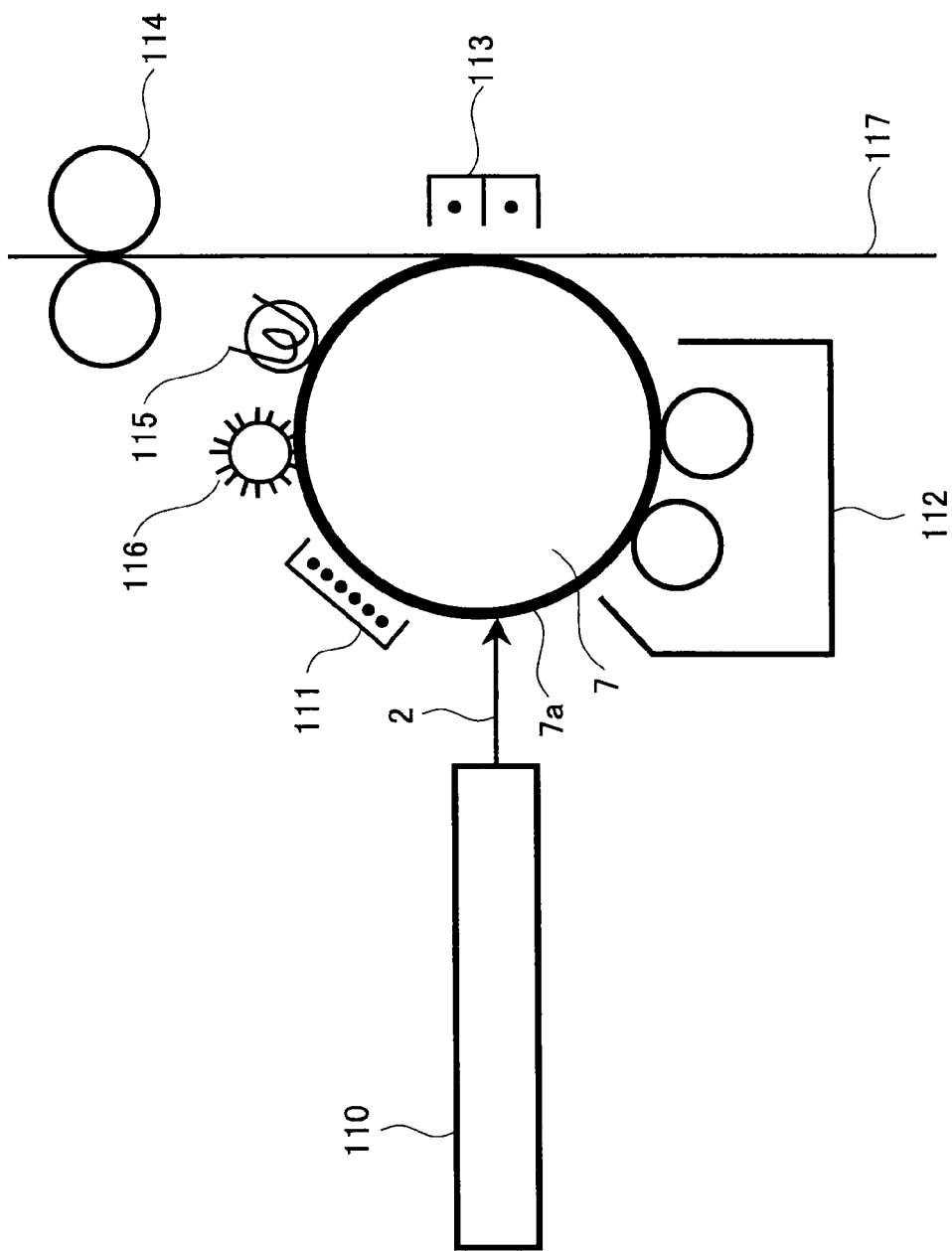
FIG. 1 is a diagram illustrating a configuration of an image forming apparatus using an optical scanning device according to the present invention.

FIG. 1 illustrates an example of an image forming apparatus using an optical scanning device according to the present invention. A scan surface 7a of the photosensitive drum 7 being rotated is uniformly charged by an electrifying device 111, and an electrostatic latent image is formed by a light flux 2 from an optical scanning device 110. The electrostatic latent image is developed by adhering toner from a developing unit 112 including developer, and a toner image is formed. Next, the toner image is transferred to an image recording sheet 117 by a transferring unit 113, and is fixed by a fixing unit 114. On the other hand, the electrostatic latent image remaining on the scan surface 7a of the photosensitive drum 7 is removed by a destaticizing unit 115, and residual toner which is not transferred is cleaned by a cleaning unit 116.

Figure 2:
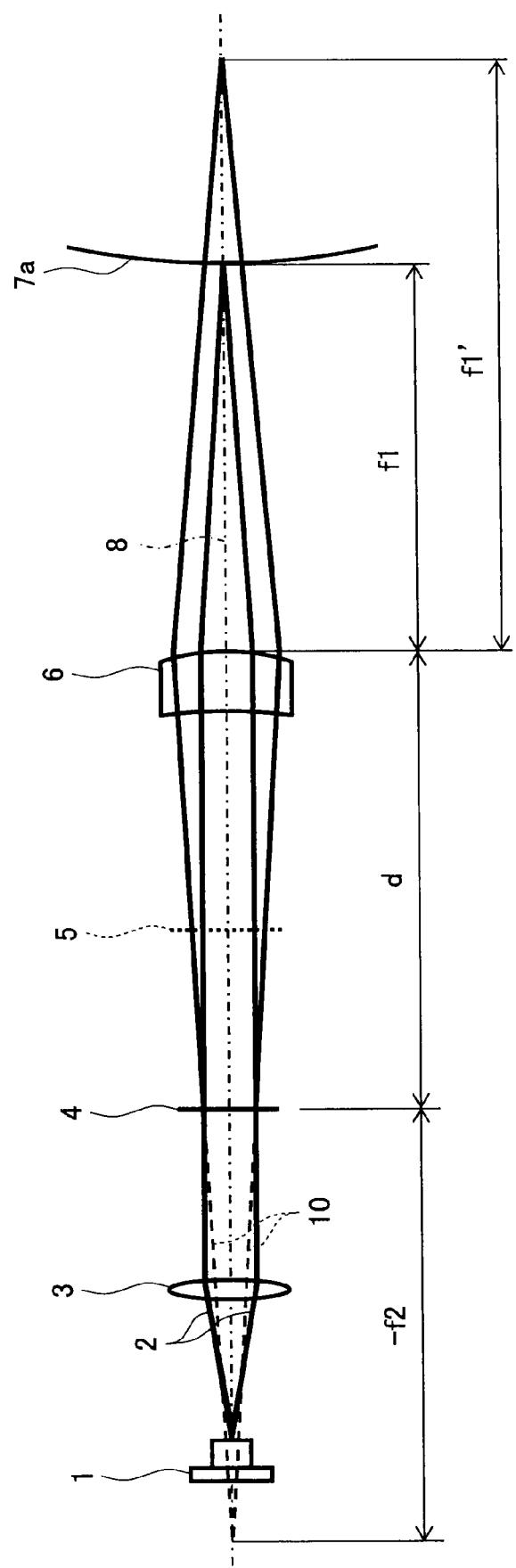
FIG. 2 is a diagram illustrating an action of a variable focus optical element in a view from a side surface of a scan surface.

A basic concept of the present invention will be described with reference to FIG. 2 illustrating a simplified configuration in which a deflection effect of the light flux by an optical deflecting unit is not shown. FIG. 2 illustrates a semiconductor laser 1 as a light source for emitting a light flux 2, a collimator lens 3 for making the light flux 2 be approximately parallel light, a liquid crystal optical element 4 which is a variable focus optical element, a polygon mirror 5 which is an optical deflector, an Fθ lens 6 which is an imaging optical element, the scan surface 7a of the photosensitive drum 7, an optical axis 8, and an extension 10 shown as an extended line of the light flux 2 in a direction from the liquid crystal optical element 4, which the light flux 2 passes, to the light source. The light flux 2 entering to the liquid crystal optical element 4 is a parallel light flux. In FIG. 2, a distance d denotes a distance between the liquid crystal optical element 4 and the Fθ lens 6, and a distance f1 denotes a focal distance of the Fθ lens 6. The distance f1 also denotes a distance between the Fθ lens 6 and the scan surface 7a. If the focal distance of the liquid crystal optical element 4 is ∞ (infinite), the light flux 2 enters the Fθ lens 6 as the parallel light flux, and an image is formed at a position of the focal distance f1 from the Fθ lens 6. If the focal distance of the liquid crystal optical element 4 is a distance −f2 (negative value), the image is formed at a position of the focal distance f1', which is given below by an expression (1), from the Fθ lens 6. A distance between principal points of an object side and an image side of the liquid crystal optical element 4 and the Fθ lens 6 is negligibly shorter.

$$1/f1'=1/f1-1/(-f2+d) \quad (1)$$

Since a second term of the right side does not become zero if the distance f2 is finite, the image is formed at a position of the focal distance f1' from the Fθ lens 6 which is different from the focal distance f1 of the Fθ lens 6. In a case in that the focal distance f1 is displaced from the scan surface 7a of the photosensitive drum 7 due to the optical path difference for some reason, it is possible to correct and reduce the imaging misalignment corresponding to a scan angle by optimizing the focal distance f2 in response to the scan angle.

First Embodiment

Figure 3:
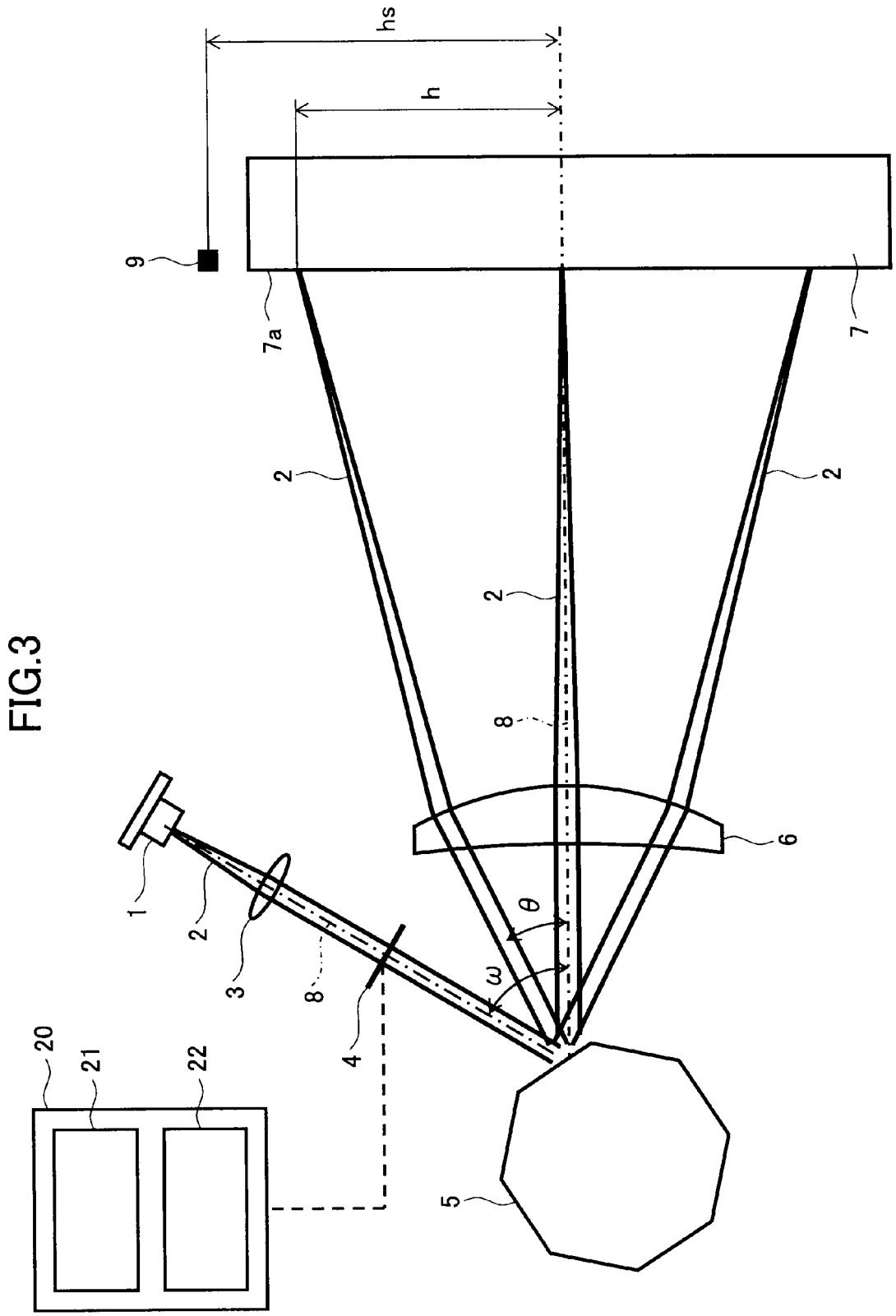
FIG. 3 is a plane view illustrating a configuration of the optical scanning device according to a first embodiment of the present invention.

FIG. 3 illustrates an optical scanning device according to a first embodiment of the present invention. Referring to FIG. 3, the optical scanning device according to the first embodiment includes the semiconductor laser 1 as the light source, the collimator lens 3 for making an entering light flux be a parallel light flux, the liquid crystal optical element 4 which is a variable focus optical element, the polygon mirror 5 which is an optical deflector, the Fθ lens 6 which is an imaging optical element, and a focal point control device 20. FIG. 3 illustrates the light flux 2 emitted from the semiconductor laser 1, the photosensitive drum 7 having the scan surface 7a, the optical axis 8, and a detecting unit 9 which detects a scan position of the light flux 2. The Fθ lens 6 is formed by one lens in which both sides are spherical surfaces.

For example, in the liquid crystal optical element 4 being the variable focus optical element, a liquid crystal layer is clamped between a first electrode and a second electrode. In this case, the first electrode and the second electrode are formed by a conductive material in which light is filtered out in a wavelength band of the light. Also, as is commonly known, one of the first electrode and the second electrode can be concentric electrodes provided in a concentric form in which the optical axis is defined as a center.

Since the focal point control device 20 is a device which controls the focal distance of the liquid crystal optical element 4, and includes a focal distance control part 21 and a correction pattern storing part 22. The correction pattern storing part 22 includes a function for storing patterns (corresponding to patterns in FIG. 5 and FIG. 10 which will be described later) in which the focal distance of the liquid crystal optical element 4 is changed. The focal distance controlling part 21 includes a function for outputting a focal distance control signal corresponding to a pattern stored in the correction pattern storing part 22, to the liquid crystal optical element 4. For example, the focal distance control signal is a voltage to be applied to the first electrode and the second electrode forming the liquid crystal optical element 4. When the focal distance control signal is applied to the first electrode and the second electrode forming the liquid crystal optical element 4, from the focal distance control part 21, a refraction index of the liquid crystal layer forming the liquid crystal optical element 4 is changed. As a result, the focal distance of the liquid crystal optical element 4 is adjusted.

For example, the focal point control device 20 changes the focal distance of the liquid crystal optical element 4 being the variable focus optical element each time in executing a deflection scan by the polygon mirror 5 as an optical deflection part in accordance with the pattern stored in the correction pattern storing part 22. In this case, the focal point control device 20 changes the focal distance of the liquid crystal optical element 4 being the variable focus optical element so as to correct the imaging misalignment on the scan surface 7a of the photosensitive drum 7 due to the optical difference being different for each scan angle within a predetermined range.

As described above, the focal point control device 20 includes the function to change the focal distance of the liquid crystal optical element 4 being the variable focus optical element each time in executing a deflection scan so as to correct the imaging misalignment on the scan surface 7a of the photosensitive drum 7 due to the optical difference being different for each scan angle within a predetermined range.

The Fθ lens 6 is designed so as to acquire a linearity as described below in an expression (2) when a scan position h is defined as a distance from the optical axis 8 of the light flux 2 on the scan surface 7a of the photosensitive drum 7, $$h = E\theta \quad (2)$$

where θ denotes the scan angle, and E denotes a scan coefficient being a constant. However, since θ and E exactly have an error from a linear relationship, a value of E given by θ=0 is called an axial scan coefficient and denoted by E0. The detecting unit 9 is arranged at a position equivalent to the scan surface 7a of the photosensitive drum 7 at a distance hs from the optical axis 8.

In the following, tables 1 through 5 are shown for surface data, aspheric surface data, single lens data, various data, and polygon mirror data. The light source is at an object surface.

Surface numbers "1" and "2" indicate refraction surfaces of the collimator lens 3. The surface number "3" is the liquid crystal optical element 4. The aperture stop is on a surface of the liquid crystal optical element 4. The surface number "4" is a reflection surface of the polygon mirror 5. The surface numbers "5" and "6" indicate refraction surfaces of the Fθ lens 6. The scan surface 7a of the photosensitive drum 7 is positioned at an image surface. The light flux incidence angle ω is an angle formed by an incoming side and an outgoing side with respect to the reflection surface of the polygon mirror 5 of the optical axis 8. An effective diameter indicates a transmission range of the light flux 2 in that the optical axis 8 is used as a reference. In the tables 1 through 5, "r" denotes a curvature radius, "d" denotes a distance to a next surface, "n" denotes a refraction index in a wavelength 656 nm, "vd" denotes an Abbe number, and "K" denotes a conical constant.

TABLE 1

SURFACE DATA

| SURFACE NUMBER | r (mm) | d (mm) | n (656 nm) | vd | EFFECTIVE DIAMETER (mm) |
|---|---|---|---|---|---|
| OBJECT SURFACE | ∞ | 32.0 | | | |
| 1 * | −48.2 | 1.4 | 1.685 | 52.7 | 1.3 |
| 2 * | −15.6 | 33.5 | | | 1.4 |
| 3 (DIAPHRAGM) | ∞ | 45.1 | | | 1.4 |
| 4 | ∞ | 73.8 | | | |
| 5 | −2222 | 14.1 | 1.721 | 28.5 | 84.5 |
| 6 | −141 | 208.9 | | | 89.2 |
| IMAGE SURFACE | ∞ | | | | |

TABLE 2

ASPHERIC SURFACE DATA

| FIRST SURFACE | K = −118 |
|---|---|
| SECOND SURFACE | K = −3.9 |

TABLE 3

SINGLE LENS DATA

| LENS | START SURFACE | FOCAL DISTANCE (mm) |
|---|---|---|
| 1 | 1 | 33.2 |
| 2 | 5 | 208.6 |

TABLE 4

VARIOUS DATA

| AXIAL SCAN COEFFICIENT: E0 | 208.5 |
|---|---|
| F NUMBER | 72.8 |
| EFFECTIVE SCAN ANGLE (rad) | ±0.503 |
| EFFECTIVE SCAN RANGE (mm) | 210.0 |
| LOCATION OF DETECTING UNIT(mm): hs | 113.6 |

TABLE 5

POLYGON MIRROR DATA

| SURFACE NUMBER | 8 |
|---|---|
| INCIRCLE RADIUS (mm) | 24.5 |
| LIGHT FLUX INCIDENCE ANGLE (rad): ω | 1.05 |

Figure 4:
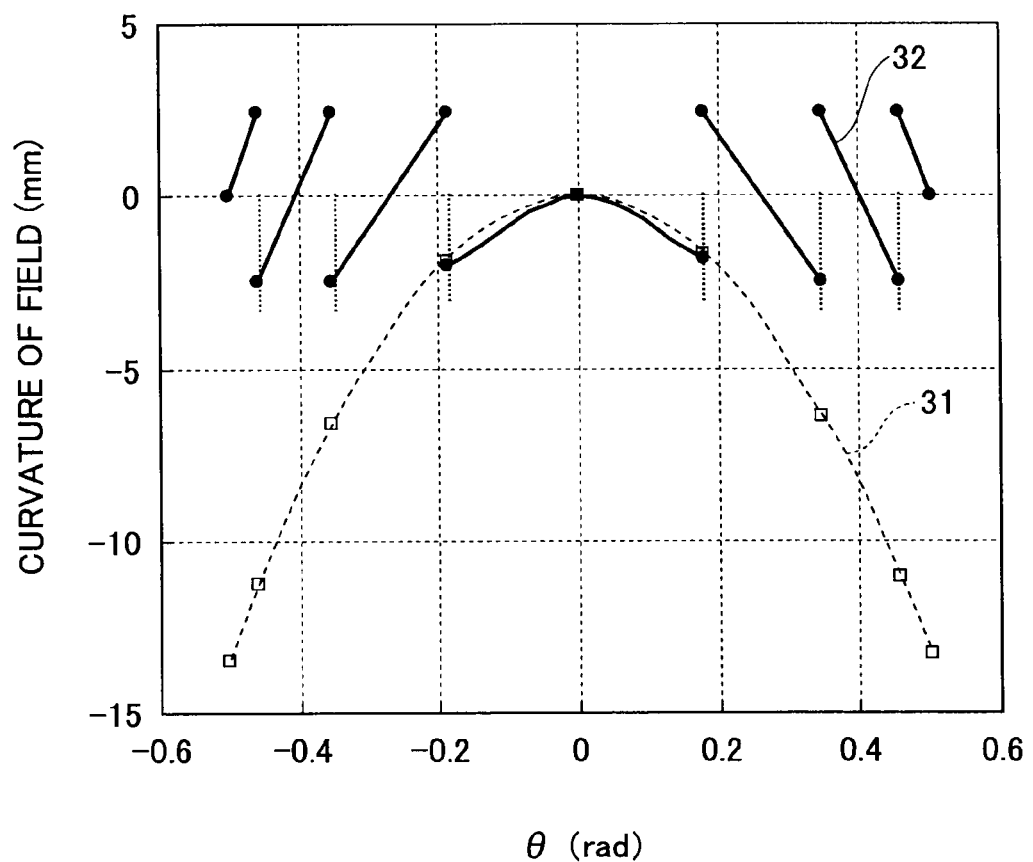
FIG. 4 is a graph illustrating a relationship between a scan angle and a curvature of an image surface, according to the first embodiment of the present invention.

FIG. 4 illustrates a relationship between a scan angle θ and the imaging misalignment, that is, a curvature of the image surface. A dashed line 31 indicates a case in that the focal distance of the liquid crystal optical element 4 is ∞ (infinite), that is, the liquid crystal optical element 4 does not have a lens action, and solid lines 32 indicate that the focal distance of the liquid crystal optical element 4 is changed in response to the scan angle θ. In a case of the dashed line 31, the curvature of the image surface is largely caused due to the optical path difference. However, by changing and correcting the focal distance by the liquid crystal optical element 4, the curvature of the image surface can be converged in a vicinity of zero. Thus, a suppression effect of the imaging misalignment can be confirmed.

A high speed conversion of a focal distance by a variable focus optical element using a liquid crystal optical element is well-known technology. For example, there are Japanese Laid-open Patents No. 05-053089, No. 09-297282, and No. 2005-115266.

The liquid crystal optical element 4 is arranged in the optical path between the semiconductor laser 1 and the polygon mirror 5. That is, since the light flux 2 is arranged at a previous stage before the light flux 2 is deflected by the polygon mirror 5, a liquid crystal optical element having the most essential effective diameter determined by an F number and a rotational symmetric structure can be applied.

Figure 5:
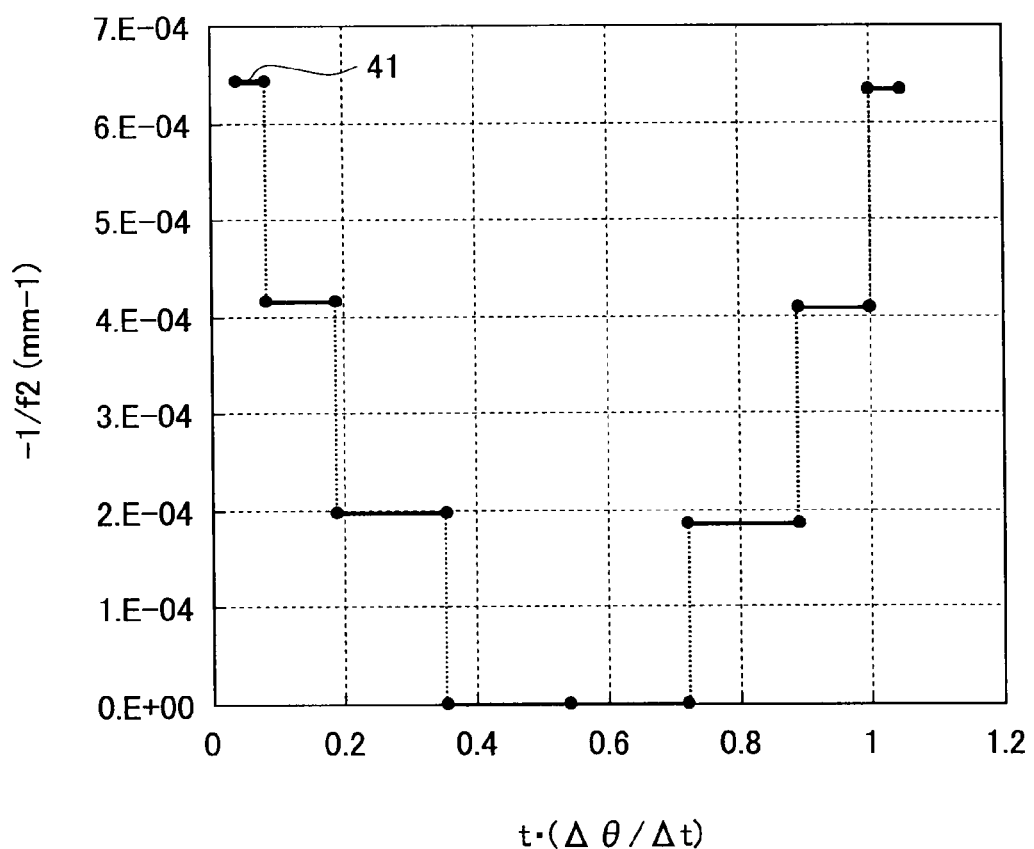
FIG. 5 is a graph illustrating a change of a focal distance of a liquid crystal optical element, according to the first embodiment of the present invention.

FIG. 5 illustrates a change of the focal distance of the liquid crystal optical element 4. A horizontal axis indicates a value acquired by multiplying an angular velocity Δθ/Δt (rad/unit time) of the scan angle θ to time t, that is, the value indicating an angle. Since the polygon mirror rotates at constant speed, the angular speed Δθ/Δt is constant. A vertical axis indicates a value in which an inverse number of the focal distance is obtained and a sign of the inverse number is inversed. In FIG. 5, time is t=0 when the light flux 2 is detected by the detecting unit 9 and a value 41 is acquired. When a specific time lapses after the light flux 2 is detected by the detecting unit 9, in this embodiment, after time t·Δθ/Δt=0.08 lapses, the focal distance of the liquid crystal optical element 4 is changed from −1/f2=6.4E−4 mm−1 to −1/f2=4.1E−4 mm−1. After that, the focal distance f2 is changed at each time t in states as illustrated in FIG. 5.

In detail, the focal distance f2 is infinite from time t=0.35 to time t=0.72. During this time period, since an absolute value of the scan angle corresponds to a smaller area and an occurrence of the imaging misalignment is smaller, it is not required to correct the liquid crystal optical element 4 in the smaller area. In the present invention, an action of the liquid crystal optical element 4 is suppressed in an area in which a correction is not always necessary. Therefore, it is possible to make the liquid crystal optical element 4 operate at a minimum action.

As described above, by including a state in that the focal distance of the liquid crystal optical element 4 being the variable focus optical element is infinite, it is possible to reduce the imaging misalignment due to the optical path difference depending on the scan angle different each scan, by a minimum action.

Figure 6:
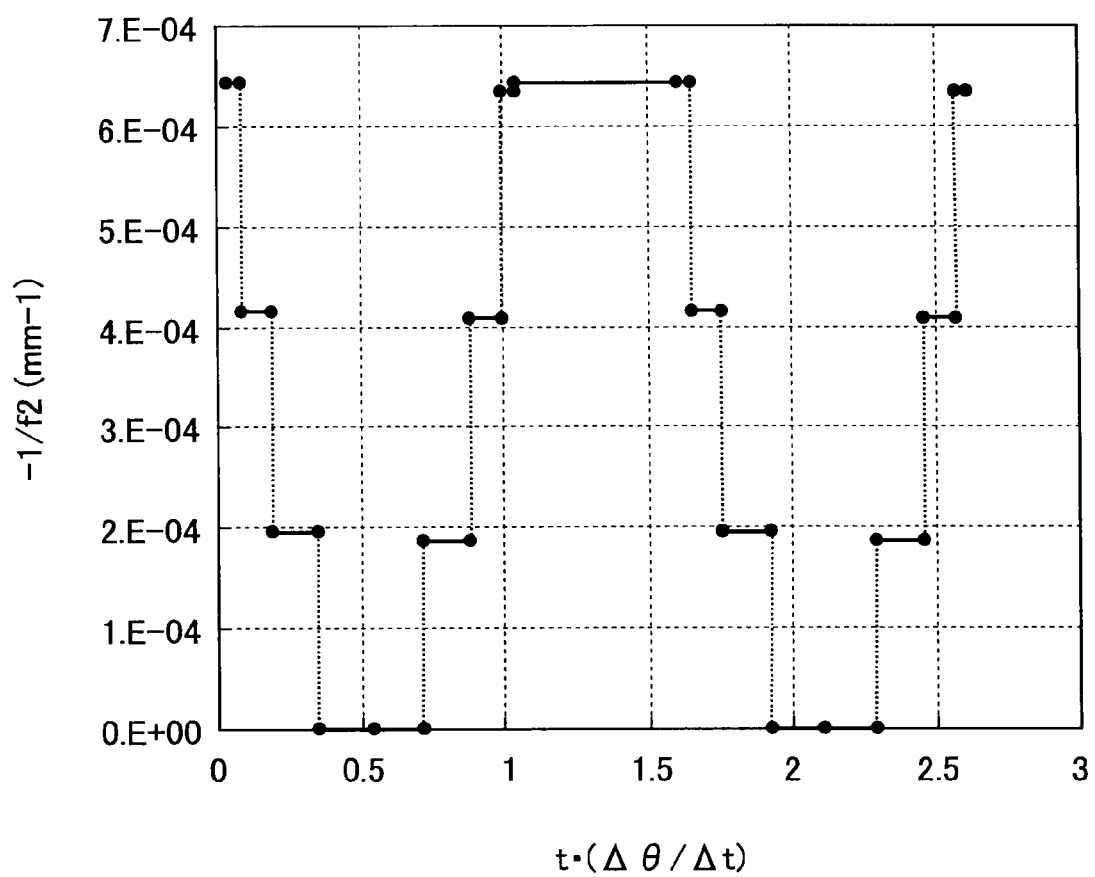
FIG. 6 is a graph illustrating the change of the focal distance of the liquid crystal optical element for two scans, according to the first embodiment of the present invention.

FIG. 6 illustrates a change of the focal distance of the liquid crystal optical element 4 for two scans. The change of the focal distance is the same at a first scan and a second scan. That is, a correction pattern of the liquid crystal optical element 4 is the same every scan. The optical path difference is independent of each scan but depends on the scan angle. The present invention, which aims to reduce the image misalignment due to the optical path difference for each scan angle, can be achieved with the same change of the focal distance as illustrated in FIG. 6. The correction pattern specific for each optical scanning device can be stored in the correction pattern storing part 22 of the focal point control device 20, and can be read out to perform the correction.

According to the first embodiment, the focal distance of the variable focus optical element is changed by corresponding to the scan angle. Therefore, it is possible to reduce the image misalignment due to the optical path difference occurred in response to the scan angle in each scan execution to a sufficient level in practice.

Second Embodiment

Figure 7:
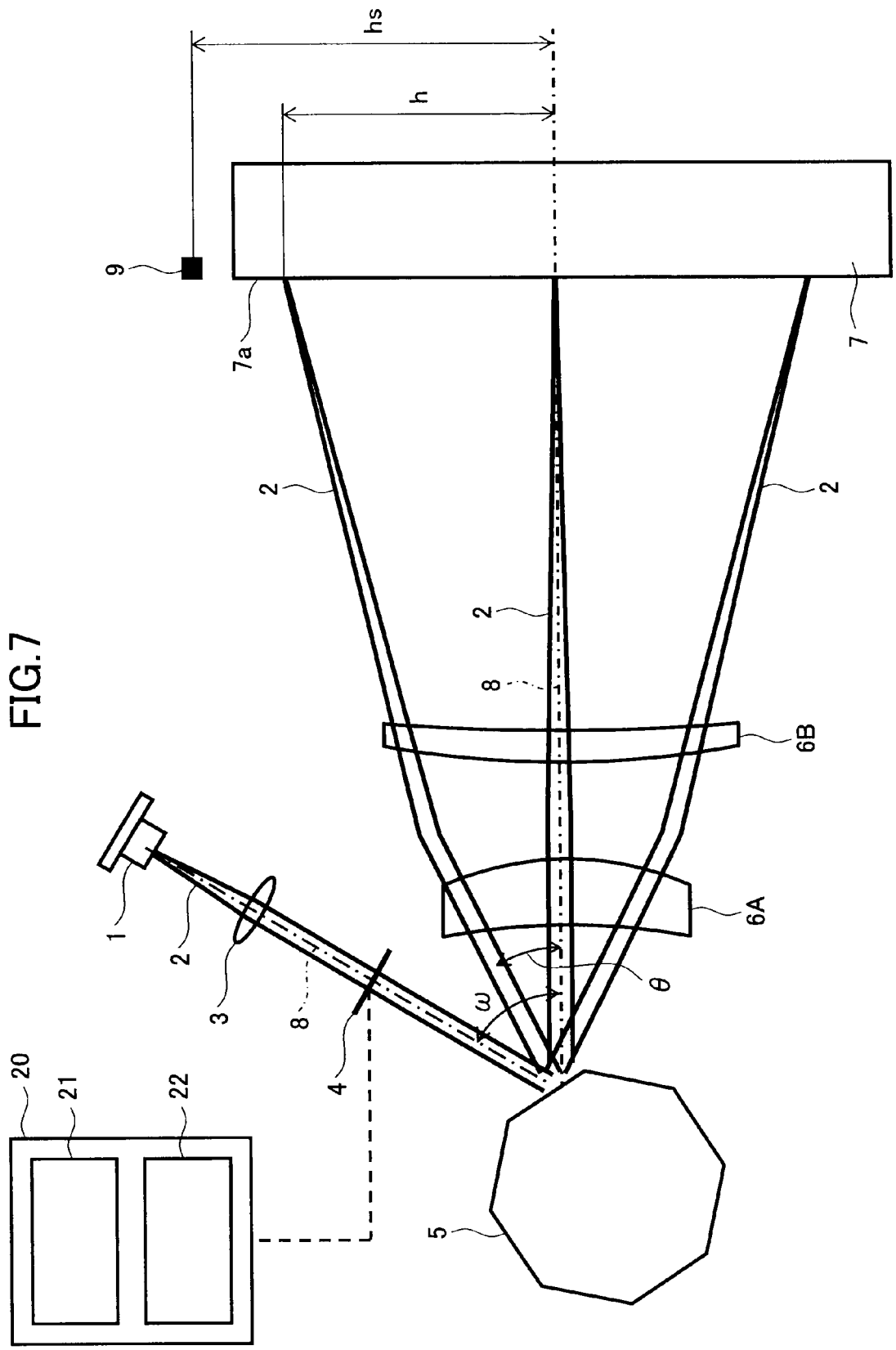
FIG. 7 is a diagram illustrating a configuration of an optical scanning device according to a second embodiment of the present invention.

FIG. 7 illustrates an optical scanning device according to a second embodiment of the present invention. In FIG. 7, elements that are the same as the ones in FIG. 3 are indicated by the same reference numerals and the explanation thereof will be omitted. Different from the first embodiment, the Fθ lens 6 being the imaging optical element is formed by two lenses 6A and 6B having spherical surfaces at both sides.

In the following, tables 6 through 10 are shown for surface data, aspheric surface data, single lens data, various data, and polygon mirror data. The light source is positioned at an object surface. Surface numbers "1" and "2" indicate refraction surfaces of the collimator lens 3. The surface number "3" is the liquid crystal optical element 4. The aperture stop is on a surface of the liquid crystal optical element 4. The surface number "4" is a reflection surface of the polygon mirror 5. The surface numbers "5" through "8" indicate refraction surfaces of the Fθ lens 6. The scan surface 7a of the photosensitive drum 7 is positioned at an image surface.

TABLE 6

SURFACE DATA

| SURFACE NUMBER | r (mm) | d (mm) | n (656 nm) | vd | EFFECTIVE DIAMETER (mm) |
|---|---|---|---|---|---|
| OBJECT SURFACE | ∞ | 32.0 | | | |
| 1 * | −48.2 | 1.4 | 1.685 | 52.7 | 1.3 |
| 2 * | −15.6 | 33.5 | | | 1.4 |
| 3 (DIAPHRAGM) | ∞ | 45.1 | | | 1.4 |
| 4 | ∞ | 21.2 | | | |
| 5 | −73.9 | 14.1 | 1.617 | 60.3 | 24.7 |
| 6 | 55.9 | 46.3 | | | 34.6 |
| 7 | 188.2 | 6.4 | 1.721 | 28.5 | 81.8 |
| 8 | 291.9 | 184.0 | | | 83.1 |
| IMAGE SURFACE | ∞ | | | | |

TABLE 7

ASPHERIC SURFACE DATA

| FIRST SURFACE | K = −118 |
|---|---|
| SECOND SURFACE | K = −3.9 |

TABLE 8

SINGLE LENS DATA

| LENS | START SURFACE | FOCAL DISTANCE (mm) |
|---|---|---|
| 1 | 1 | 33.2 |
| 2 | 5 | 285.6 |
| 3 | 7 | 716.4 |

TABLE 9

VARIOUS DATA

| AXIAL SCAN COEFFICIENT: E0 | 208.0 |
|---|---|
| F NUMBER | 72.8 |
| EFFECTIVE SCAN ANGLE (rad) | ±0.503 |
| EFFECTIVE SCAN RANGE (mm) | 210.0 |
| LOCATION OF DETECTING UNIT(mm): hs | 113.6 |

TABLE 10

POLYGON MIRROR DATA

| SURFACE NUMBER | 8 |
|---|---|
| INCIRCLE RADIUS (mm) | 24.5 |
| LIGHT FLUX INCIDENCE ANGLE (rad): ω | 1.05 |

Figure 8:
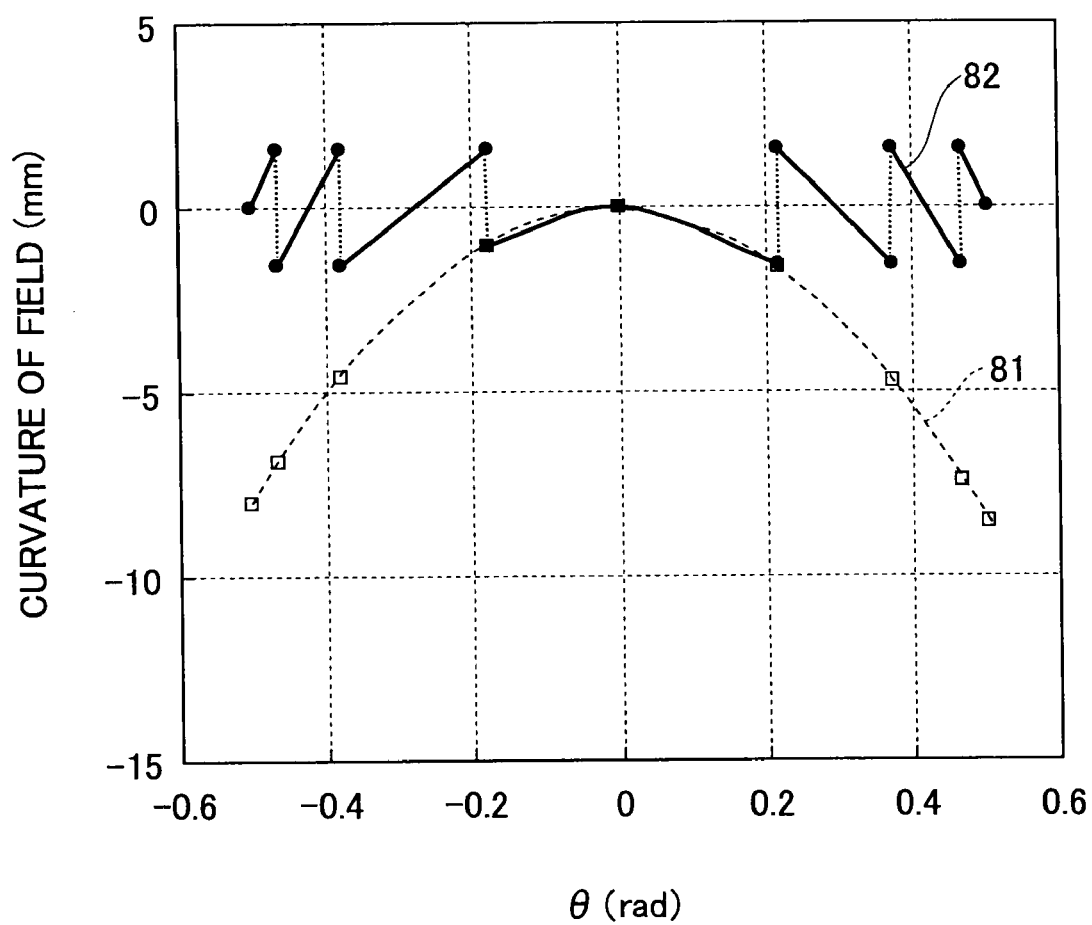
FIG. 8 is a graph illustrating a relationship between a scan position and a curvature of an image surface, according to the second embodiment of the present invention.

FIG. 8 illustrates a relationship between the scan position h and the imaging misalignment, that is, a curvature of the image surface. A dashed line 81 indicates a case in that the focal distance of the liquid crystal optical element 4 is ∞ (infinite), that is, the liquid crystal optical element 4 does not have a lens action, and solid lines 82 indicates that the focal distance of the liquid crystal optical element 4 is changed in response to the scan angle θ. In a case of the dashed line 81, the curvature of the image surface is greatly occurred due to the optical path difference. On the other hand, in cases of the solid lines 82, the curvature of the image surface is converged in a vicinity of approximately zero by the action of the liquid crystal optical element 4. Thus, a suppression effect of the imaging misalignment can be confirmed.

Figure 9:
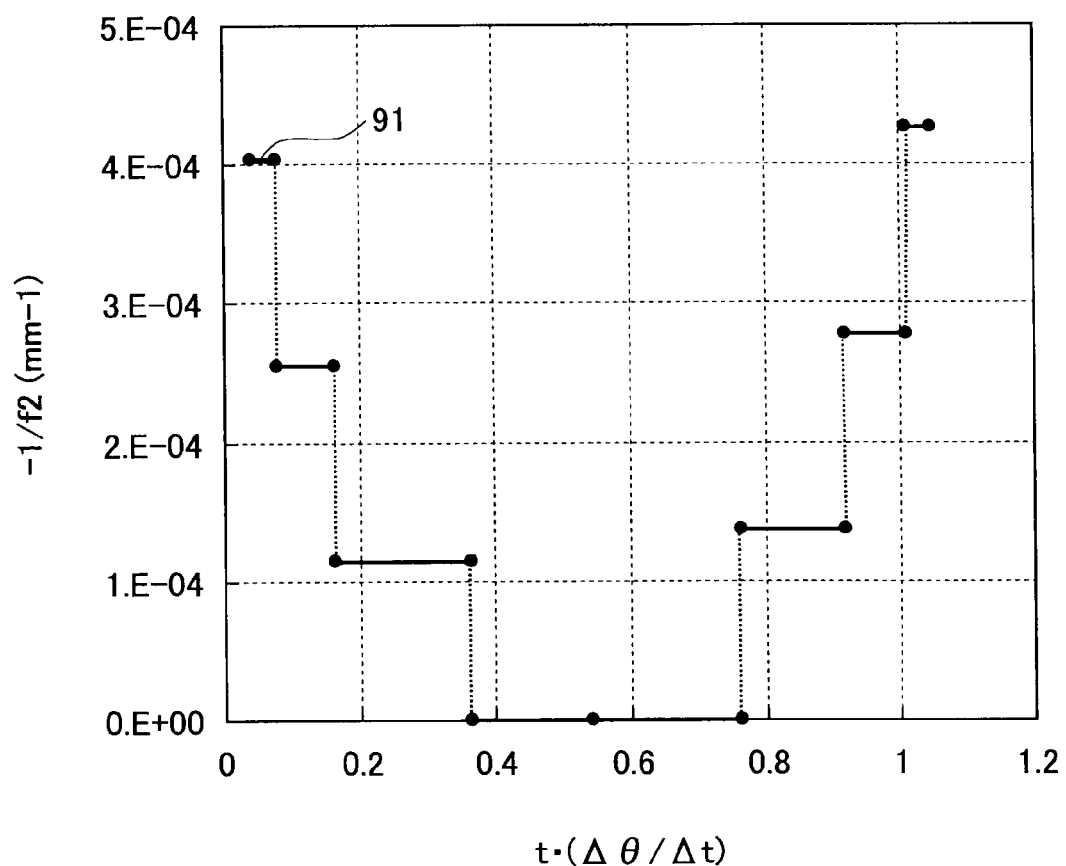
FIG. 9 is a graph illustrating a change of a focal distance of a liquid crystal optical element, according to the second embodiment of the present invention.

FIG. 9 illustrates a change of the focal distance of the liquid crystal optical element 4. A horizontal axis indicates a value acquired by multiplying an angular velocity $\Delta\theta/\Delta t$ (rad/unit time) of the scan angle θ to time t, that is, the value indicating an angle. Since the polygon mirror 5 rotates at constant speed, the angular speed $\Delta\theta/\Delta t$ is constant. A vertical axis indicates a value in which an inverse number of the focal distance is obtained and a sign of the inverse number is inversed. In FIG. 9, time is t=0 when the light flux 2 is detected by the detecting unit 9 and a value 91 is acquired. When a specific time lapses after the light flux 2 is detected by the detecting unit 9, in this embodiment, after time $t \cdot \Delta\theta/\Delta t = 0.08$ lapses, the focal distance of the liquid crystal optical element 4 is changed from $-1/f2 = 4.0E-4$ mm−1 to $-1/f2 = 2.6E-4$ mm−1. After that, the focal distance f2 is changed at each time t as illustrated in FIG. 9.

In the second embodiment in which the Fθ lens 6 being the imaging optical element 4 is formed with two lenses 6A and 6B, the amount to change the focal distance of the liquid crystal optical element 4 and the curvature of the image surface are smaller than the first embodiment in which the Fθ lens 6 is formed with one lens. The number of lenses for the Fθ lens 6 being the imaging optical element 4 is selected in a specification including a requirement of the optical scanning device, and the present invention can be applied in either case.

As described above, according to the second embodiment, similar to the first embodiment, the focal distance of the variable focus optical element is changed by corresponding to the scan angle. Therefore, by the above described simplified configuration, it is possible to reduce the image misalignment due to the optical path difference occurred in response to the scan angle in each scan execution to a sufficient level in practice. In addition, the following effect can be obtained. That is, by forming the Fθ lens 6 with a plurality of lenses (for example, two lenses 6A and 6B), the amount to change the focal distance of the liquid crystal optical element 4 and the curvature of the image surface can be smaller than the first embodiment in which the Fθ lens 6 is formed with one lens.

Third Embodiment

Figure 10:
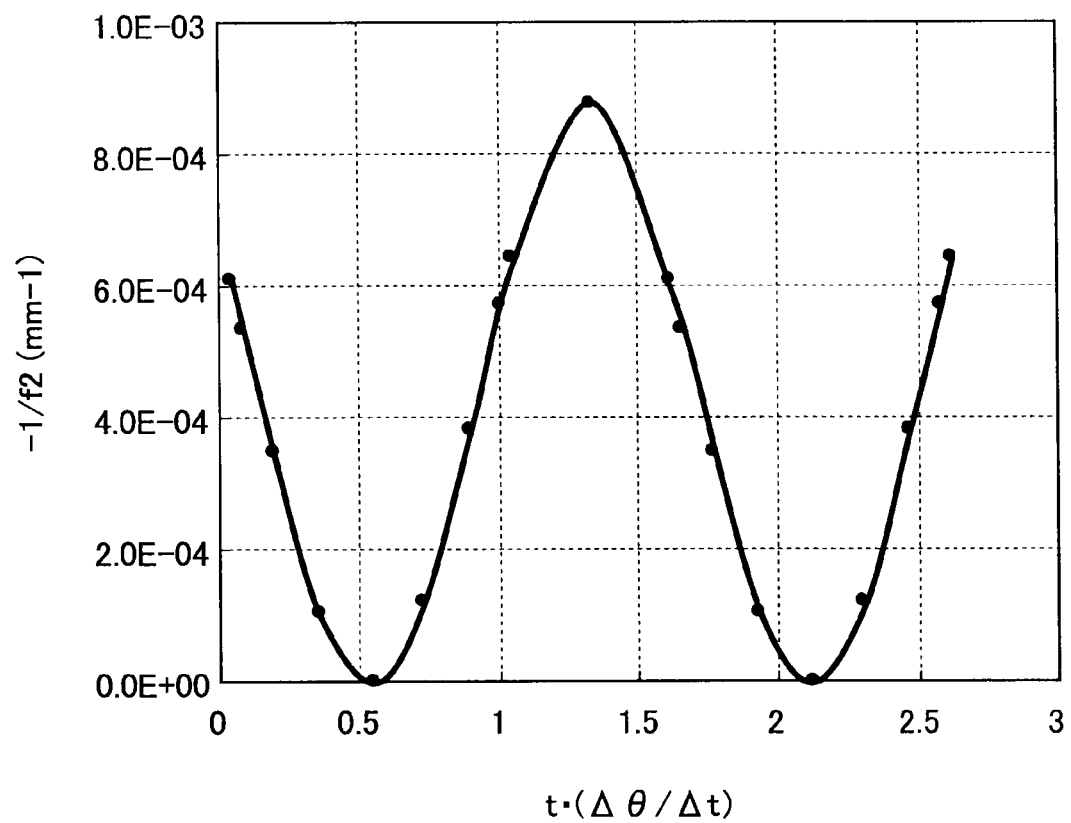
FIG. 10 is a graph illustrating a change of a focal distance of a liquid crystal optical element, according to a third embodiment of the present invention.

A configuration of an optical scanning device in the third embodiment is the same as the configuration of the optical scanning device in the first embodiment illustrated in FIG. 3, and the explanation thereof will be omitted. FIG. 10 illustrates change of the focal distance of the liquid crystal optical element 4 for two scans. As illustrated in FIG. 10, the change of the focal distance of the liquid crystal optical element 4 in the third embodiment is different from the change of the focal distance of the liquid crystal optical element 4 in the first embodiment. The change of the focal distance of the liquid crystal optical element 4 illustrated in FIG. 10 is given by a sine function of an expression (3).

$$-1/f2 = \xi(1+(\sin(\alpha t(\Delta\theta/\Delta t)-\phi))) \quad (3)$$

where $\xi=4.4E-4$, $\alpha=4$, and $\phi=3.7$. These numerical values are acquired by calculating a sine wave so that a change 102 in FIG. 11 (described later) becomes smaller, under a condition where $-1/f2=0$ at $t\cdot\Delta\theta/\Delta t=0.54, 2.11, \ldots$ similarly as illustrated in FIG. 6. It should be noted that $\xi=4.4E-4$, $\alpha=4$, and $\phi=3.7$ are used as one example, and an appearance of the change 102 in FIG. 11 (described later) is varied if these numerical values are changed. Also, these numerical values depend on the surface data and the like.

Since $\alpha=4$ in the expression (3), a period of the sine is $\pi/2$ ($=1.57$). Thus, the expression (3) is a consecutive sine function being constant and independent for each scan. As illustrated in FIG. 10, $t\cdot\Delta\theta/\Delta t=0.54$ corresponds to a scan angle 0 (zero), and $-1/f2=0$ at this point, that is, the focal distance f2 becomes infinite.

Figure 11:
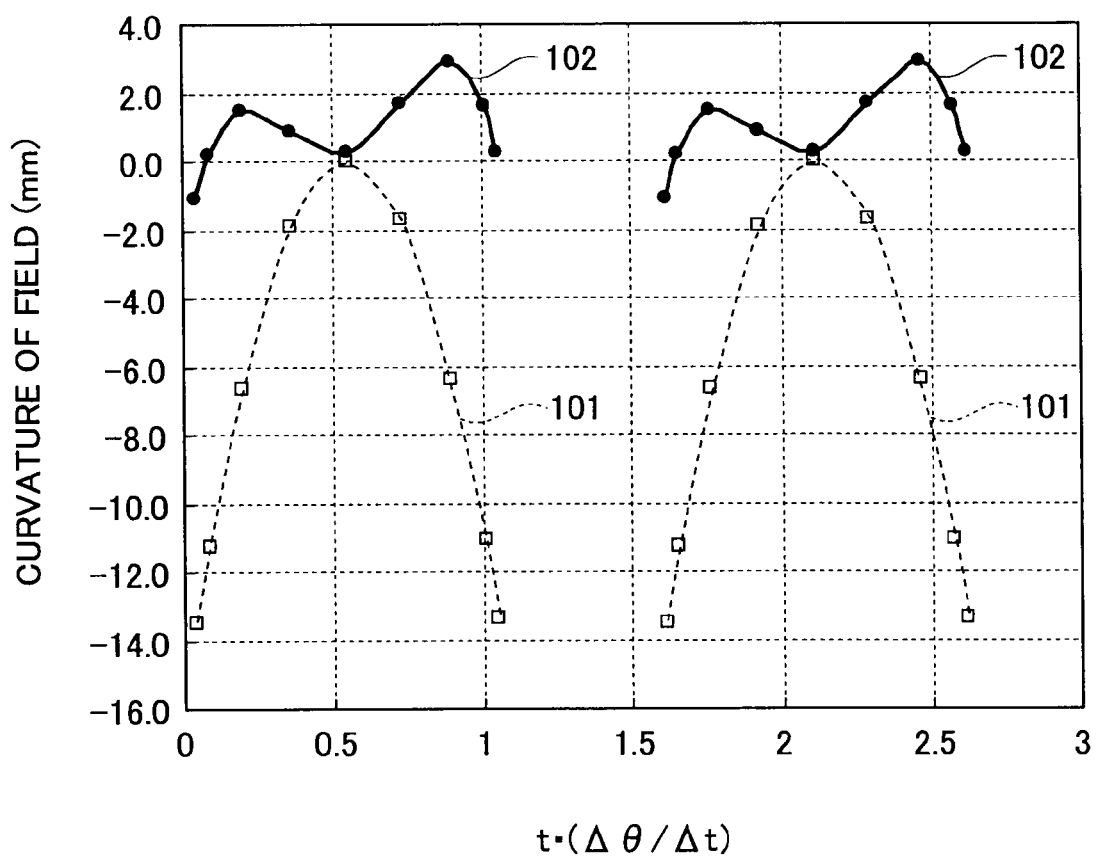
FIG. 11 is a graph illustrating a relationship between an angle t (Δθ/Δt) and a curvature of an image surface, according to the third embodiment of the present invention.

FIG. 11 illustrates a relationship between the angle $t(\Delta\theta/\Delta t)$ and the imaging misalignment, that is, a curvature of the image surface. A dashed line 101 indicates a case in that the focal distance of the liquid crystal optical element 4 is always ∞ (infinite), that is, the liquid crystal optical element 4 does not have an action, and a solid line 102 indicates that the focal distance of the liquid crystal optical element 4 is changed by the sine function as illustrated in FIG. 10. Thus, a successive suppression effect of the curvature of the image surface due to the action of the liquid crystal optical element 4 can be confirmed.

As described above, according to the third embodiment, similar to the first embodiment, the focal distance of the variable focus optical element is changed by corresponding to the scan angle. Therefore, by the above described simplified configuration, it is possible to reduce the image misalignment due to the optical path difference occurred in response to the scan angle in each scan execution to a sufficient level in practice. In addition, the following effect can be obtained. That is, since the change of the focal distance for each scan of the liquid crystal optical element being the variable focus optical element is the sine function, it is possible to consecutively reduce the imaging alignment due to the optical path difference caused by the scan angle, without depending on each scan.

Fourth Embodiment

Figure 12:
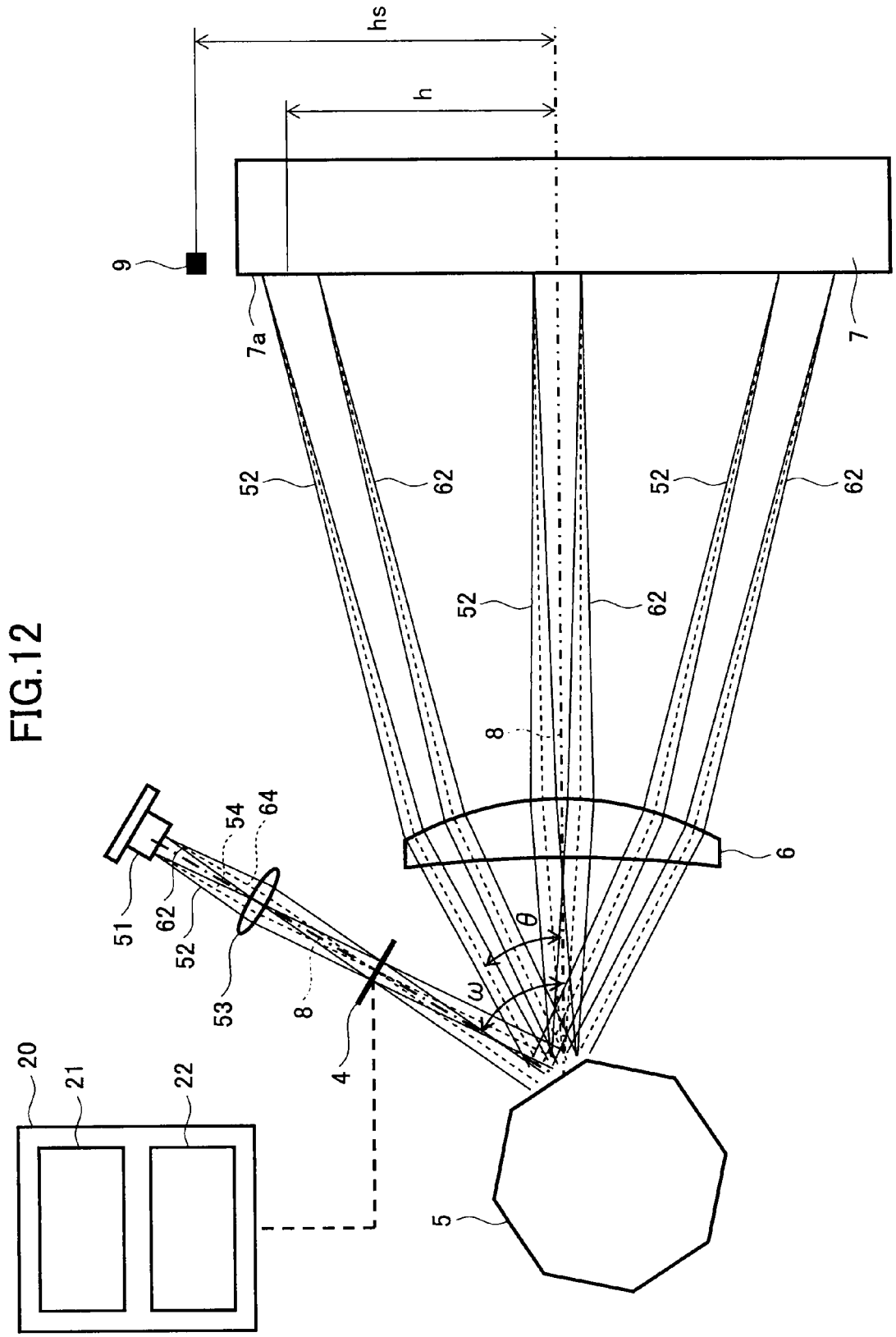
FIG. 12 is a plane view illustrating a configuration of an optical scanning device according to a fourth embodiment of the present invention.

FIG. 12 illustrates an optical scanning device according to a fourth embodiment of the present invention. Referring to FIG. 12, the optical scanning device according to the fourth embodiment includes a multi-element laser 51 which is a light source, a collimator lens 53 which is a convergence optical element for making an incoming light flux be a parallel light flux, the liquid crystal optical element 4 which is the variable focus optical element, and the polygon mirror 5 which is the light deflection part, the Fθ lens 6 which is the imaging optical element, and the focal point control apparatus 20. In FIG. 12, light fluxes 52 and 62 are shown as light fluxes emitted from the light source 51, principal rays 54 and 64 are shown for the light fluxes 52 and 62, the photosensitive drum 7 is shown as a photosensitive drum having the scan surface 7a, the light axis 8 is shown, and the detecting unit 9 is shown as a detector for detecting a scan location of the light fluxes 52 and 62. In FIG. 12, the light fluxes 52 and 62 are represented as typical light fluxes in a plurality of light fluxes.

The focal point control apparatus 20 is an apparatus for controlling the focal distance of the liquid crystal optical element 4, and includes a function to correct the imaging misalignment on the scan surface 7a of the photosensitive drum 7 due to the optical path difference for each scan angle, by changing the focal distance of the liquid crystal optical element 4 being the variable focus optical element, in executing each of the deflection scans using the polygon mirror 5 being the optical deflection part. A configuration of focal point control apparatus 20 is the same as the configuration in the first embodiment, and detailed explanations thereof will be omitted.

The Fθ lens 6 is formed by one lens which both sides are spherical. The liquid crystal optical element 4 is arranged at a position of a focal point behind the collimator lens 53. The principal rays 54 and 64 are converged at the position of the focal point behind the collimator lens 53. The surface data, the aspheric surface data, the single lens data, the various data, and the polygon mirror data are the same as the ones in the first embodiment.

Figure 13:
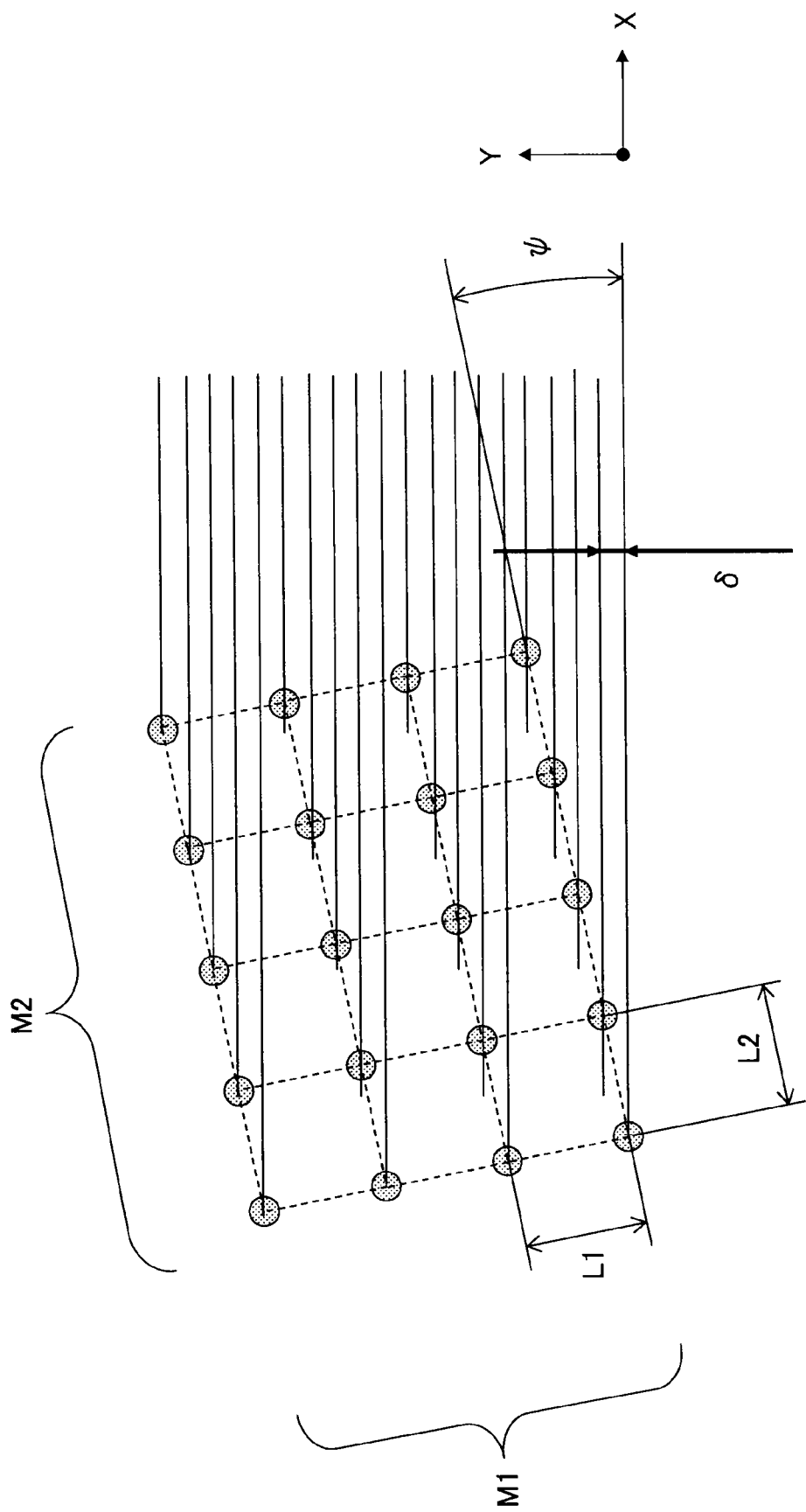
FIG. 13 is a diagram illustrating a light source arrangement of a multi-element laser according to the fourth embodiment of the present invention.

A light source arrangement of the multi-element laser 51 will be described with reference to FIG. 13. FIG. 13 illustrates an example of a surface emission-type laser having a element number N=20, an element array M1×M2=4×5, and an element interval $L1=L2=0.8/1200$ inch. In the surface emission-type laser exemplified in FIG. 13, an array angle $\phi$ is 0.197rad with respect to a light flux deflection plane (X), and elements are arranged at intervals zeta of $0.16/1200$ inch in a direction (Y) perpendicular to the light flux deflection plane (X). Scan lines are formed at identical intervals on the scan surface 7a of the photosensitive drum 7 by magnifying conjugate magnification from the light source and the photosensitive drum 7.

Moreover, it is possible for the light flux deflection plane (X) to adjust a position of each of a plurality of beam on the scan surface 7a of the photosensitive drum 7 by using the detecting unit 9. Technology for adjusting writing out positions of the plurality of beams by using a signal for a timing detection is well known. For example, Japanese Laid-open Patents No. 08-164632, No. 2000-352677, and No. 2002-048988 disclose the technologies. It is not difficult to apply these technologies to the present invention.

Figure 14:
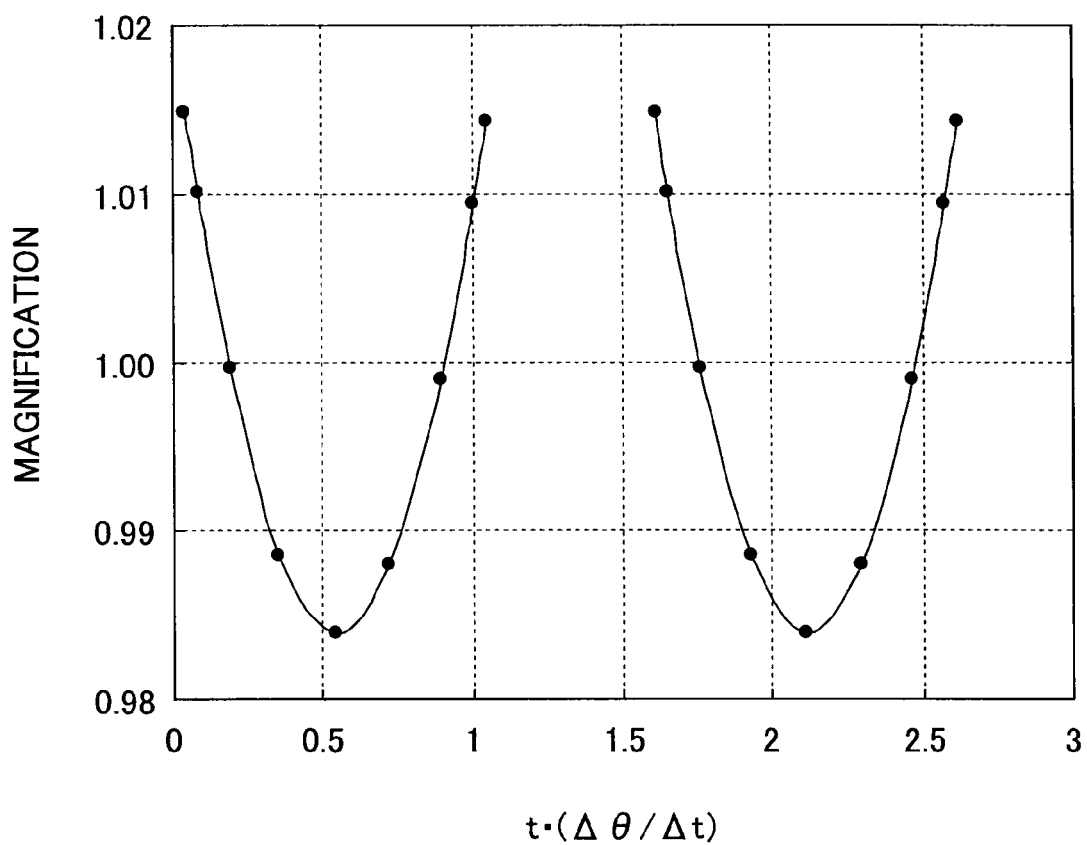
FIG. 14 is a graph illustrating a relationship between a scan position and a scan line interval, according to the fourth embodiment of the present invention.

FIG. 14 illustrates scan line intervals in the direction (Y) with respect to scan lines at intervals of 1/1200 inch on the scan surface of the photosensitive drum 7. In the fourth embodiment, an error is suppressed within ±2%. If the error becomes greater, a dispersion of the scan line intervals becomes wider, and a print quality is degraded due to a banding. In the present invention, since the liquid crystal optical element 4 is arranged at a position where the principal rays 54 and 64 of the plurality of light fluxes 52 and 62 are converged, that is, where incidence heights of the principal rays 54 and 64 are zero, the principal rays 54 and 64 are not affected even if the focal distance of the liquid crystal optical element 4 is changed. Accordingly, the value of ±2% is constant independently of an action of the liquid crystal optical element 4. In the same reason, the liquid crystal optical element 4 used in the present invention does not include a correction action of the scan line position. For example, in order to correct a curve of the scan line, Japanese Laid-open Patent No. 2003-215484 discloses a technology using a liquid crystal optical element having a deflection action, which can be combined with the present invention.

There are well-known technologies in which the liquid crystal optical element includes the focal distance being isotropic to the optical axis, and a technology to change the focal distance at high speed. For example, Japanese Laid-open Patents No. 05-053089, No. 09-297282, and No. 2005-115266 disclose these technologies. Japanese Laid-open Patent No. 2008-203360 discloses an example in which the liquid crystal optical element is changed to positive and negative focal distances including an infinite distance. It is not difficult to apply these technologies to the present invention.

Another reason will be described to arrange the liquid crystal optical element at a previous stage before the light flux 2 is deflected by the polygon mirror 5. A symmetric property in a direction perpendicular to a deflection direction of the light flux 2 is lost, if the liquid crystal optical element 4 is a subsequent stage after the light flux 2 is deflected by the polygon mirror 5. However, by arranging the liquid crystal optical element 4 at the previous stage, it is possible to correspond to this matter by the minimum effective diameter for a light flux diameter determined by the F number, and the liquid crystal optical element 4 performing an isotropic change of the focal distance.

As described above, according to the fourth embodiment, similar to the first embodiment, by changing the focal distance of the variable focus optical element with respect to the scan angle, it is possible to reduce the imaging misalignment due to the optical path difference caused in response to the scan angle in executing each of the scans in the simplified configuration, to the sufficient level in practice. Moreover, the fourth embodiment exerts the following effect. That is, in the optical scanning apparatus including a light source for emitting a plurality of light fluxes, the liquid crystal optical element 4 being the variable focus optical element is arranged in a vicinity of a location where the principal rays 54 and 64 of the plurality of light fluxes are converged. Therefore, without changing the scan line positions of the plurality of light fluxes 52 and 62, it is possible to reduce the image alignment due to the optical path difference for each scan angle.

According to the present invention, it is possible to provide the optical scanning device, the control method of the optical scanning device, and the image forming apparatus using the optical scanning device, in which the image misalignment occurred by corresponding to the scan angle in executing each of scans.

The present invention is not limited to the specifically disclosed embodiments, and variations and modifications may be made without departing from the scope of the invention.

For example, in the fourth embodiment, similar to the second embodiment, the Fθ lens being the imaging optical element can be formed by two lenses.

Moreover, in the above-described aspect and first through fourth embodiments of the present invention, the liquid crystal optical element 4 is exemplified as the variable focus optical element. However, the variable focus optical element cannot be limited to the liquid crystal optical element 4. For example, as the variable focus optical element, an electro-optical crystal element, an optical element by a piezo drive, and a like can be used.

The present application is based on the Japanese Priority Patent Applications No. 2008-197227 filed Jul. 31, 2008 and No. 2009-039703 filed Feb. 23, 2009, the entire contents of which are hereby incorporated by reference.

What is claimed is:

1. An optical scanning device, comprising:
a light deflection part configured to repeatedly deflect and scan a light flux emitted from a light source on a scan surface;
an imaging optical element configured to form an image in a vicinity of the scan surface with the light flux;
a variable focus optical element arranged in an optical path from the light source to the light deflection part; and
a focal point control device configured to change a focal distance of the variable focus optical element in executing each of deflection scans, and correct an image misalignment on the scan surface due to an optical path difference for each scan angle,
wherein the variable focus optical element is controlled so that a correction pattern of the focal distance in executing each of the deflection scans is substantially identical, and
wherein the correction pattern is based upon an angular velocity of the light deflection part, time, and the focal distance.

2. The optical scanning device as claimed in claim 1, wherein the focal point control device includes a correction pattern storage part configured to store a correction pattern of the variable focus optical element for each of the deflection scans.

3. The optical scanning device as claimed in claim 1, wherein the light deflection part includes a polygon mirror and the scan surface is formed on a photosensitive surface.

4. The optical scanning device as claimed in claim 1, wherein the variable focus optical element changes the focal distance isotropic to an optical axis of the light flux.

5. The optical scanning device as claimed in claim 1, wherein the variable focus optical element includes a liquid crystal optical element.

6. The optical scanning device as claimed in claim 1, wherein a change of the focal distance of the variable focus optical element with respect to time is a sine function.

7. The optical scanning device as claimed in claim 1, wherein a change of the focal distance of the variable focus optical element includes an infinite state.

8. The optical scanning device as claimed in claim 1, wherein the imaging optical element includes a plurality of lenses.

9. The optical scanning device as claimed in claim 1, wherein a plurality of light fluxes are emitted from the light source.

10. The optical scanning device as claimed in claim 9, wherein a convergence optical element including an action for converging a principal ray of the plurality of light fluxes emitted from the light source is arranged in the optical path from the light source to the light deflection part, and the variable focus optical element is arranged in a vicinity of a position where the principal ray of the plurality of light fluxes is converged.

11. An image forming apparatus including an optical scanning device, wherein said optical scanning device comprises:
  a light deflection part configured to repeatedly deflect and scan a light flux emitted from a light source on a scan surface;
  an imaging optical element configured to form an image in a vicinity of the scan surface with the light flux;
  a variable focus optical element arranged in an optical path from the light source to the light deflection part; and
  a focal point control device configured to change a focal distance of the variable focus optical element in executing each of deflection scans, and correct an image misalignment on the scan surface due to an optical path difference for each scan angle,
  wherein the variable focus optical element is controlled so that a correction pattern of the focal distance in executing each of the deflection scans is substantially identical, and
  wherein the correction pattern is based upon an angular velocity of the light deflection part, time, and the focal distance.

12. A control method of an optical scanning device, comprising:
  repeatedly deflecting and scanning a light flux emitted from a light source on a scan surface by a light deflection part;
  forming an image in a vicinity of the scan surface with the light flux by an imaging optical element;
  changing a focal distance of a variable focus optical element, which is arranged in an optical path from the light source to the light deflection part, in executing each of deflection scans, and correcting an image misalignment on the scan surface due to an optical path difference for each scan angle, the changing of the focal distance being controlled so that a correction pattern of the focal distance in executing each of the deflection scans is substantially identical, the correction pattern being based upon an angular velocity of the light deflection part, time, and the focal distance.

* * * * *